(12) United States Patent
Phillips

(10) Patent No.: US 11,538,129 B2
(45) Date of Patent: Dec. 27, 2022

(54) VERIFICATION SYSTEM

(71) Applicant: VISITLOCK LLC, Lighthouse Point, FL (US)

(72) Inventor: Kevin Robert Phillips, Deerfield Beach, FL (US)

(73) Assignee: Visitlock LLC, Lighthouse Point, FL (US)

( * ) Notice: Subject to any disclaimer, the term of this patent is extended or adjusted under 35 U.S.C. 154(b) by 287 days.

(21) Appl. No.: 16/819,108

(22) Filed: Mar. 15, 2020

(65) Prior Publication Data

US 2021/0287317 A1    Sep. 16, 2021

(51) Int. Cl.
*G06F 21/32* (2013.01)
*H04W 12/06* (2021.01)
*H04W 12/00* (2021.01)
*H04W 4/029* (2018.01)
*G06Q 50/26* (2012.01)
*H04W 12/63* (2021.01)

(52) U.S. Cl.
CPC .......... *G06Q 50/265* (2013.01); *G06F 21/32* (2013.01); *H04W 4/029* (2018.02); *H04W 12/068* (2021.01); *H04W 12/63* (2021.01); *G06F 2221/2111* (2013.01); *G06Q 2230/00* (2013.01)

(58) Field of Classification Search
CPC .............. G06Q 2230/00; G06Q 50/265; H04L 63/0861; G06F 21/32; G06F 2221/2111; H04W 4/029; H04W 12/068; H04W 12/63
USPC ....................................................... 705/325
See application file for complete search history.

(56) References Cited

U.S. PATENT DOCUMENTS

| 7,237,717 B1* | 7/2007 | Rao .......................... H04L 69/16 235/386 |
| 2012/0164982 A1* | 6/2012 | Klein ..................... G07C 13/00 455/411 |
| 2018/0322264 A1* | 11/2018 | Phillips .................... H04W 4/02 |
| 2020/0151989 A1* | 5/2020 | Gorenstein ............ G06F 21/604 |
| 2021/0209628 A1* | 7/2021 | Bamali ............ G06Q 20/40145 |

OTHER PUBLICATIONS

Biometric secured mobile voting; Gentles et al; Dec. 2011 (Year: 2011).*
A secure e-Government's e-voting system; Sedky et al, Sep. 2015 (Year: 2015).*

* cited by examiner

*Primary Examiner* — Jahangir Kabir
(74) *Attorney, Agent, or Firm* — The Law Firm of AQ Basit

(57) ABSTRACT

A device includes memory and a processor. The device receives biometric information. The device receives location information. The device analyzes the received biometric information with stored biometric information. The device analyzes the received location information with stored location information. The device determines whether the received biometric information matches the stored biometric information. The device determines whether the received location information matches the stored location information. The device sends an electronic communication that indicates whether the received biometric information matches the stored biometric information and whether the received local information matches stored geographic location that is not within a particular distance of another geographic location.

9 Claims, 18 Drawing Sheets

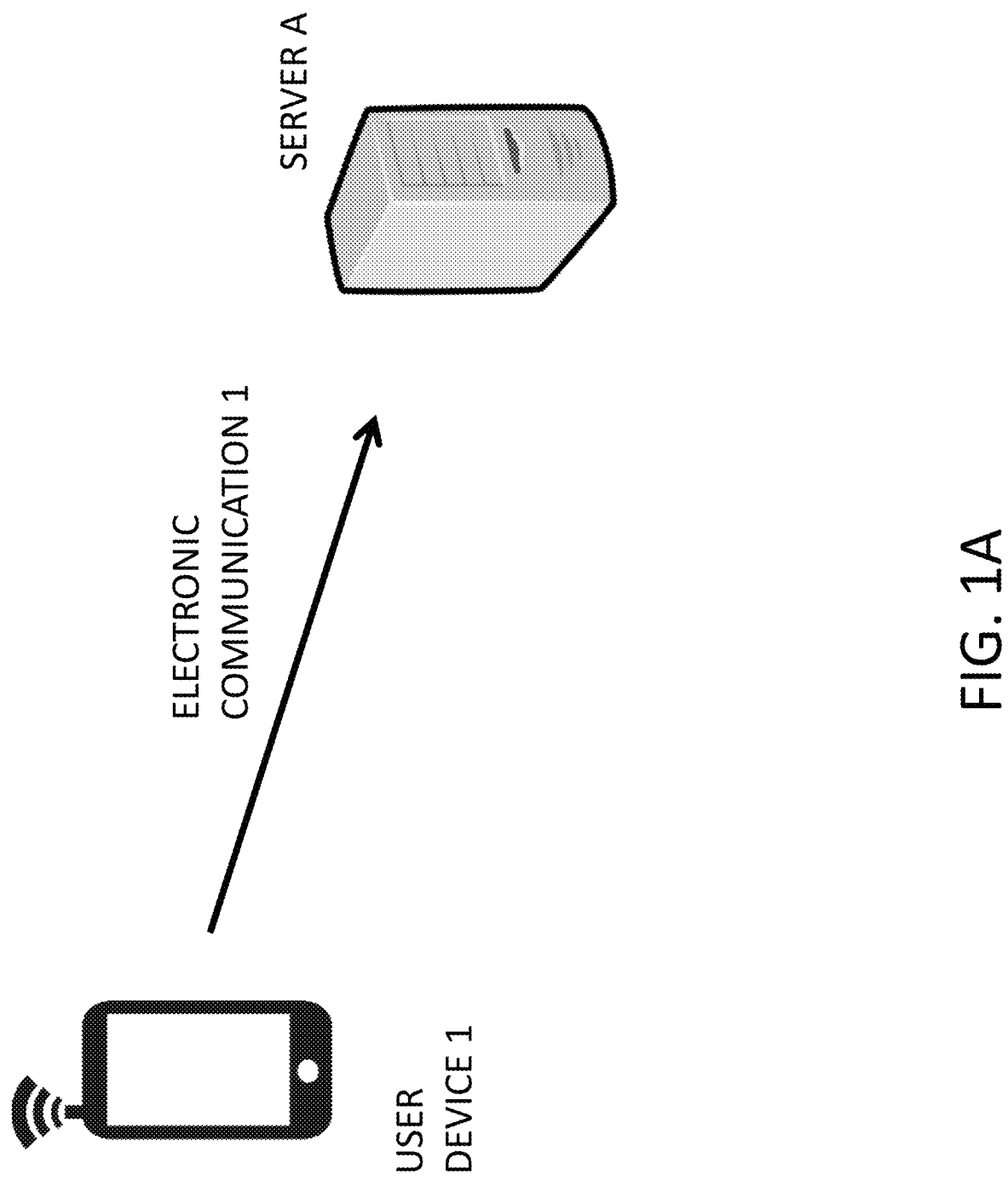

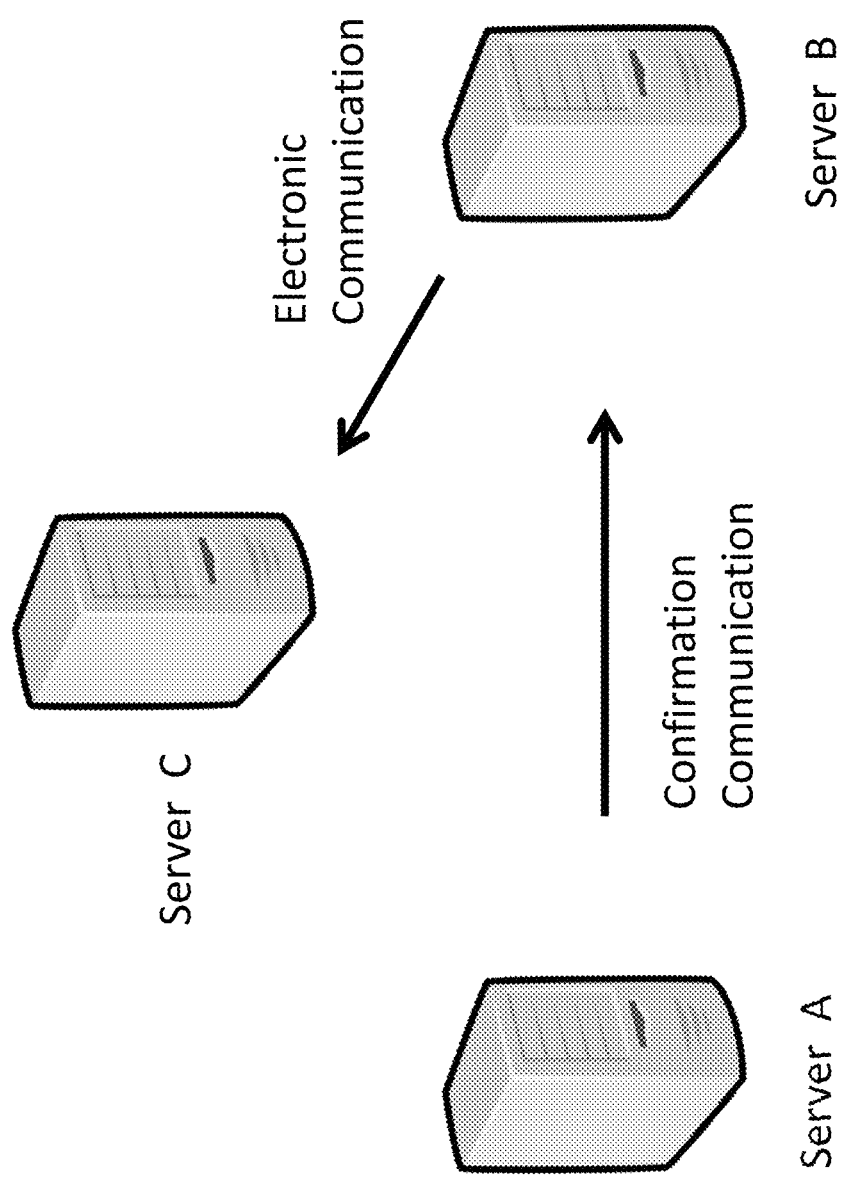

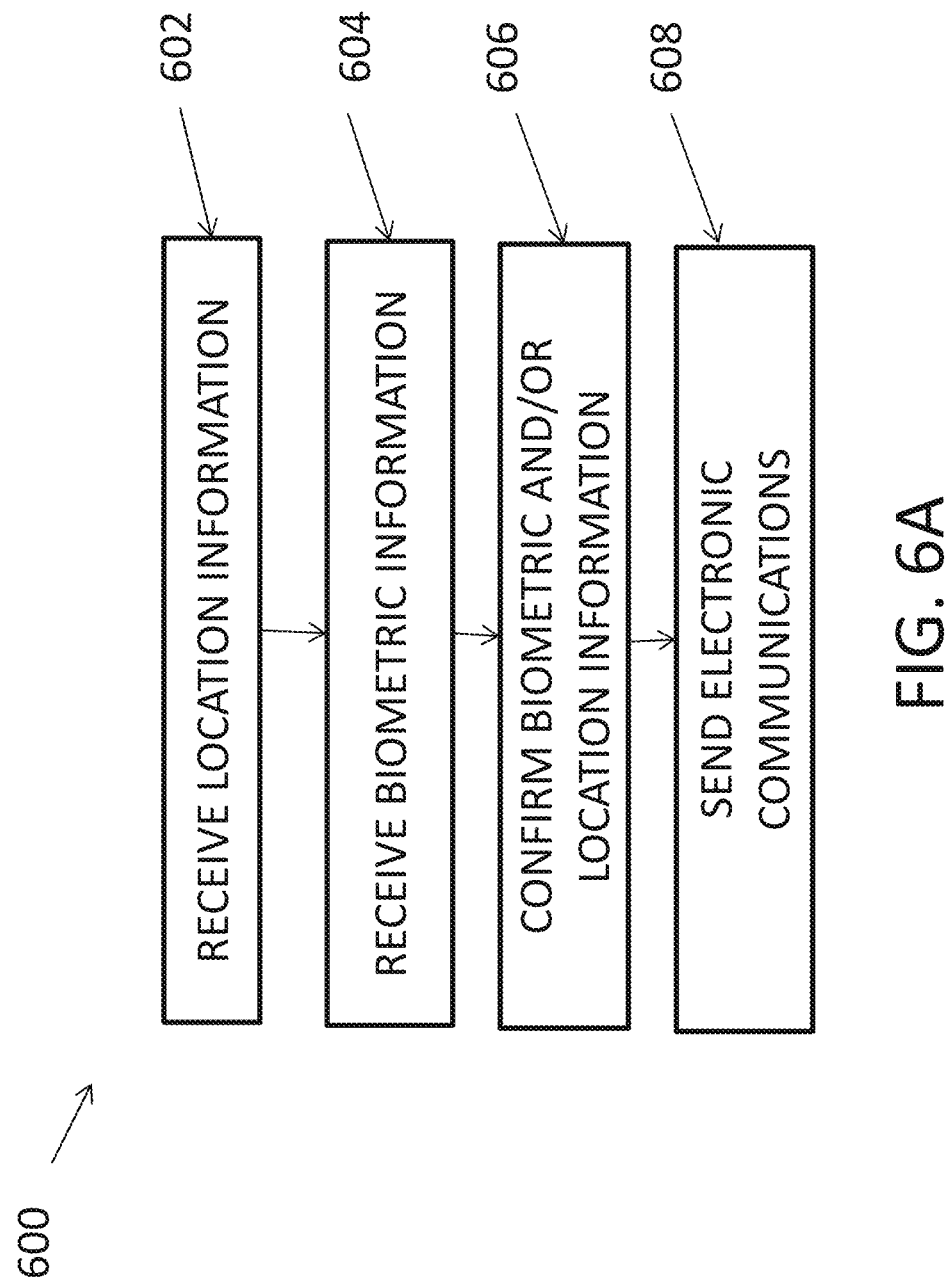

| ID (702) | BIOMETRIC (704) | LOCATION (706) | CONFIRMED (708) |
|---|---|---|---|
| A2C | 8 | 2 | Y |
| K8Y | 2 | 6 | N |
| 9V7 | NULL | 3 | N |
| • • | • • | • • | • • |
| • • | • • | • • | • • |

FIG. 7

VERIFICATION SYSTEM

BACKGROUND

At any given time, any person may be at any particular location. There may be other organizations that may require confirmation of the person at a particular location to ensure that the person is at that location. Currently, there is no way of confirming that the person is at the location conducting those services based on the person's biometric information.

BRIEF DESCRIPTION OF DRAWINGS

FIGS. 1A-1D are diagrams of an example environment in which systems and/or methods described herein may be implemented;

FIGS. 6A-6B are flow charts of example processes for confirming electronic information;

FIG. 7 is an example database structures that store electronic information;

DETAILED DESCRIPTION OF PREFERRED EMBODIMENTS

Figure 1B:
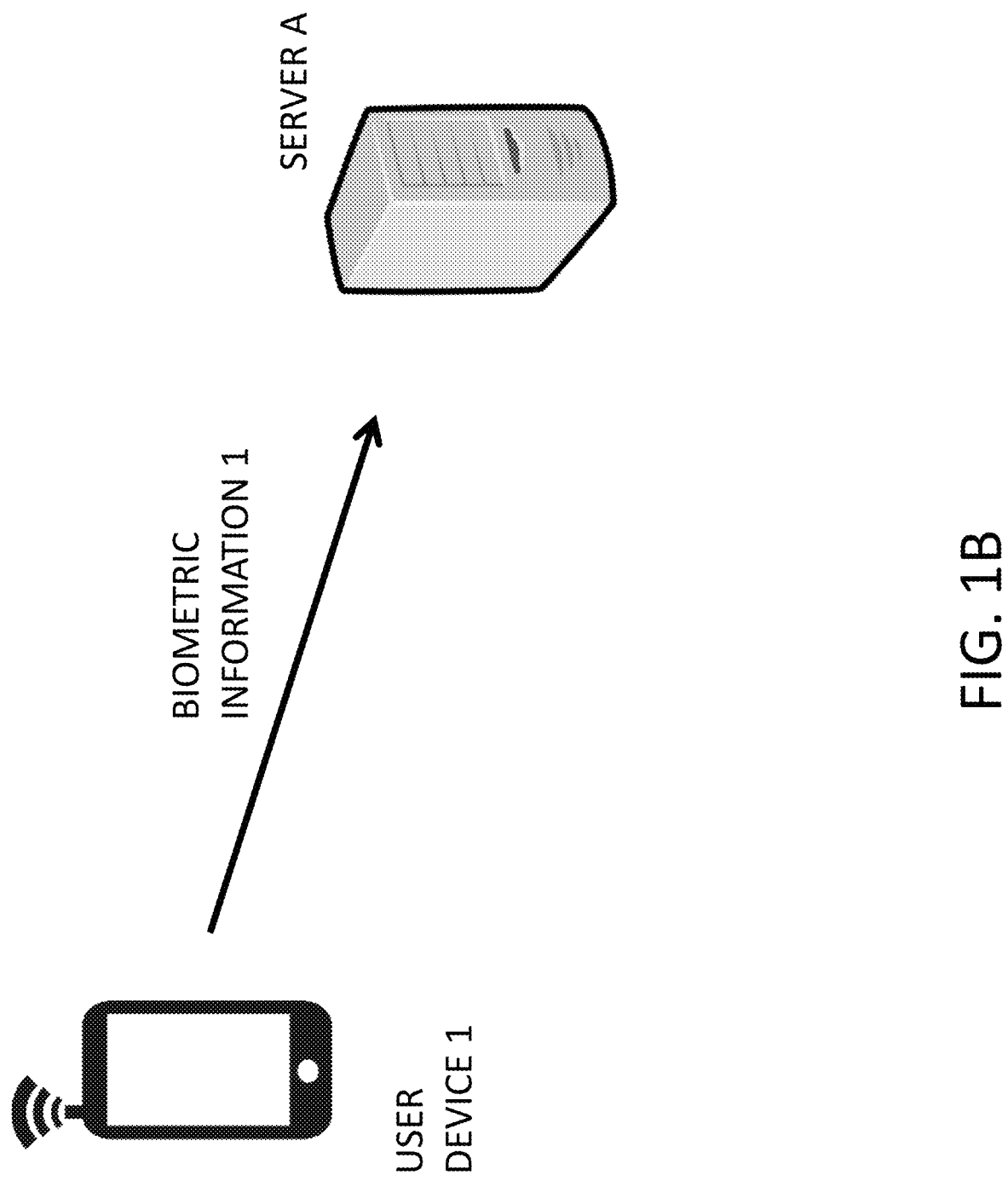

The following detailed description refers to the accompanying drawings. The same reference numbers in different drawings may identify the same or similar elements.

Systems, devices, and/or methods described herein may allow for a user, using an electronic application implemented on a computing device (e.g., smartphone, laptop, etc.), to verify that the user is at a particular geographic location based on the user's biometric information. In verifying the user's geographic location, a government or other organization may confirm that a person is located at a particular place at a particular time. For example, an individual who is out of the country may be required to provide confirmation of location at a particular time to provide authorization prior to permission for the individual to enter an absentee ballot for voting. In further embodiments, confirmation may be conducted to confirm that a person is not in a particular place at a particular time as an additional way to provide authorization for that person to enter an absentee ballot for voting.

The registration information may include the person's name, gender, date of birth, employer information, government-issued licensure information, and/or any other information (e.g., voter registration card, citizenship, drivers license, etc.). In this non-limiting example, a person, who is on business in Japan, may send a communication to an entity (e.g., a county election division) that they are outside of their voting area and would like to enter an absentee ballot. In receiving the communication, the entity (via electronic and computer-based processes) may confirm the person is in Japan and also confirm that the person cannot arrive at the voting area on election day. Additionally or alternatively, the entity may confirm the person is not in the voting area. In another non-limiting example, a person, who is on vacation in Spain, may send a communication to an entity that they are outside of their voting area and would like to enter an absentee ballot. The person may be required to send the communication while in the presence of another person who may also send a communication to the entity that the person is in Spain. Based on the two communications, the entity may confirm that the person is not in the voting area. Accordingly, the electronic application may send an electronic communication to a computing device (e.g., a server) to verify the biometric information and verify an absent voter's geographic location. The absent voter may also provide their biometric information and/or geographic location via the electronic application to the computing device. Accordingly, the computing device may determine that the absent voter and the confirming party are both at the same or similar geographic location and provide permissions for other electronic transactions and/or communications to occur.

By having one's location and identity verified to be in a particular location and/or not be in another location, according to the one or more, methods, processes, or systems described in the following figures, other electronic communications may occur and/or additional confirmations. Furthermore, the electronic application may be used to comply with regulations associated the enforcement of immigration and criminal laws.

Accordingly, the electronic application may provide one or more electronic processes that (1) obtain biometric information about one or more persons, (2) electronically receive and verify biometric information about the one or more persons, (3) obtain and verify the geographic location of the one or more persons associated with the biometric information and that one or more people are at the same location at the same, or similar, time, (4) in real-time and/or simultaneously, generate additional electronic communications that permit additional electronic transactions to occur, and (5) use the verification to comply with one or more government regulations. Thus, technological features described in the following figures provide for a verification process that requires computer-based technology and cannot be performed outside a computing technological environment.

Figure 1C:
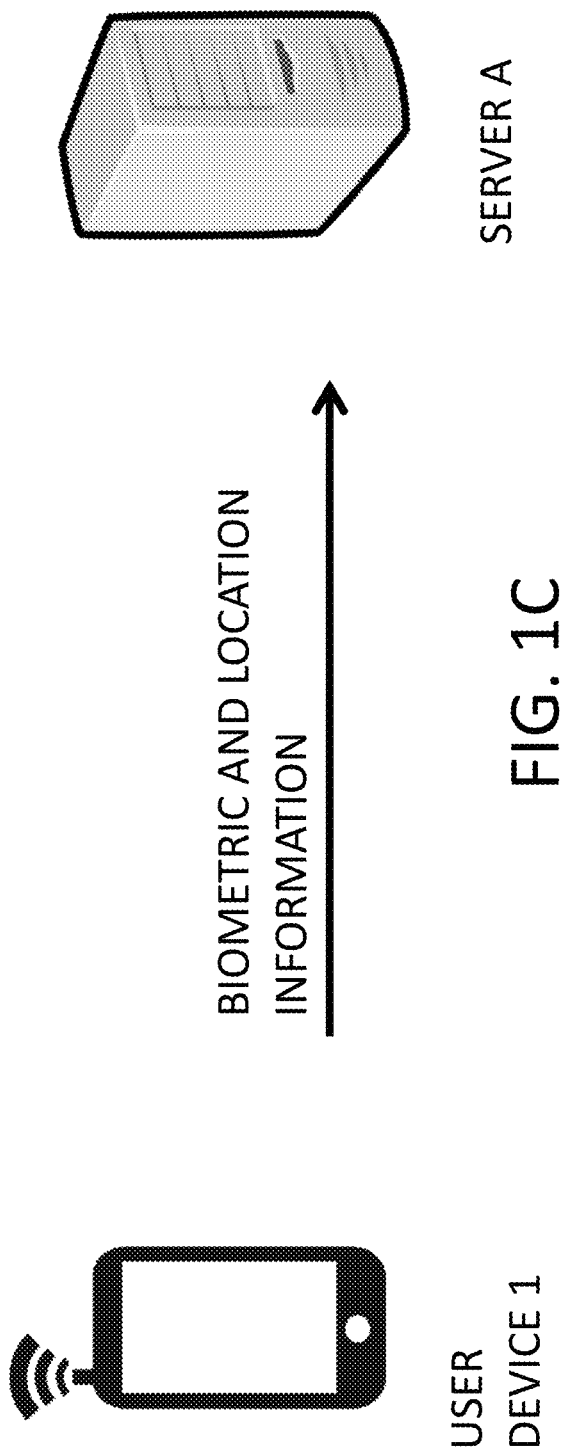

FIGS. 1A-1D describe an example process of verifying one or more persons based on their biometric and location information. FIGS. 1A and 1B describe a process for registering one or more persons with an electronic application. FIG. 1C describes providing biometric and location information and verifying the biometric and location information. FIG. 1D describes sending one or more electronic communications based on verifying the biometric and location information.

As shown in FIG. 1A, user device 1 (e.g., a smartphone, a laptop, a computing device, etc.) may each send an electronic communication (electronic communication 1) to server A for purposes of registering a voter who may not be in a particular area for voting in person. In this non-limiting example, electronic communication 1 may include registration information about the absent voter. Thus, electronic communication 1 may include the absent voter's name, voter registration card, driving license, social security information, and/or citizenship information. Thus, server A may receive electronic communications 1 and generate a registration identifier for the absent voter.

For registering with the electronic application, as shown in FIG. 1B, user device 1 may send biometric information 1 to the server. In this non-limiting example, biometric information 1 may include biometric information that is electronically obtained by user device 1 and electronically sent to server A. Biometric information 1 may include fingerprint information, retina information, facial information, audible (e.g., voice) information, and/or any other type of biometric information. In this non-limiting example, biometric information 1 may be associated with an absent voter. While FIGS. 1A and 1B show electronic communication 1 and biometric information 1 as two separate communications, they may be sent as one electronic communication.

As shown in FIG. 1C, at a later time, the law enforcement professional may be at the person of interest's home and may send an electronic communication that includes both the absent voter's biometric and current location information. As shown FIG. 1C, the biometric and electronic information is sent to server A (via a network or other communications system, such as a cellular system, global positioning system (GPS), etc.) along with a particular time associated with the biometric and electronic information.

Upon receiving the biometric and current location information of the absent voter, server A may confirm the received biometric information of the absent voter with the stored biometric information of the absent voter which was sent previously and as described in FIG. 1B. Furthermore, server A may confirm that the absent voter is not in a particular geographic area since to enter an absentee ballot, a person has to be confirmed to be outside the area of the polling stations. Additionally, server A may confirm that the absent voter is unable to travel to a polling station on a particular day to enter a vote in person. Finally, by confirming the biometric identity of the absent voter, the voter may electronically vote on their user device. Thus, as shown in FIG. 1D, server A sends a confirmation communication to server B and C. In this non-limiting example, server B may determine that based on the confirmation of biometric, time, and/or location information that a person is not in a particular geographic location to conduct voting in person and an electronic communication including one or more additional electronic communications is sent from server B to server C.

Thus, as shown in FIGS. 1A-1D, a person may (1) undergo a registration process that requires providing registration information that includes biometric information, (2) provide biometric information and/or location information that is used to confirm that particular person is not in a particular geographic location, (3) upon confirmation, provide other electronic communications (e.g., validation of absence of a voter) to an entity associated with the holding and operating elections (e.g., county election division) based on confirming the biometric and/or location information.

Figure 2:
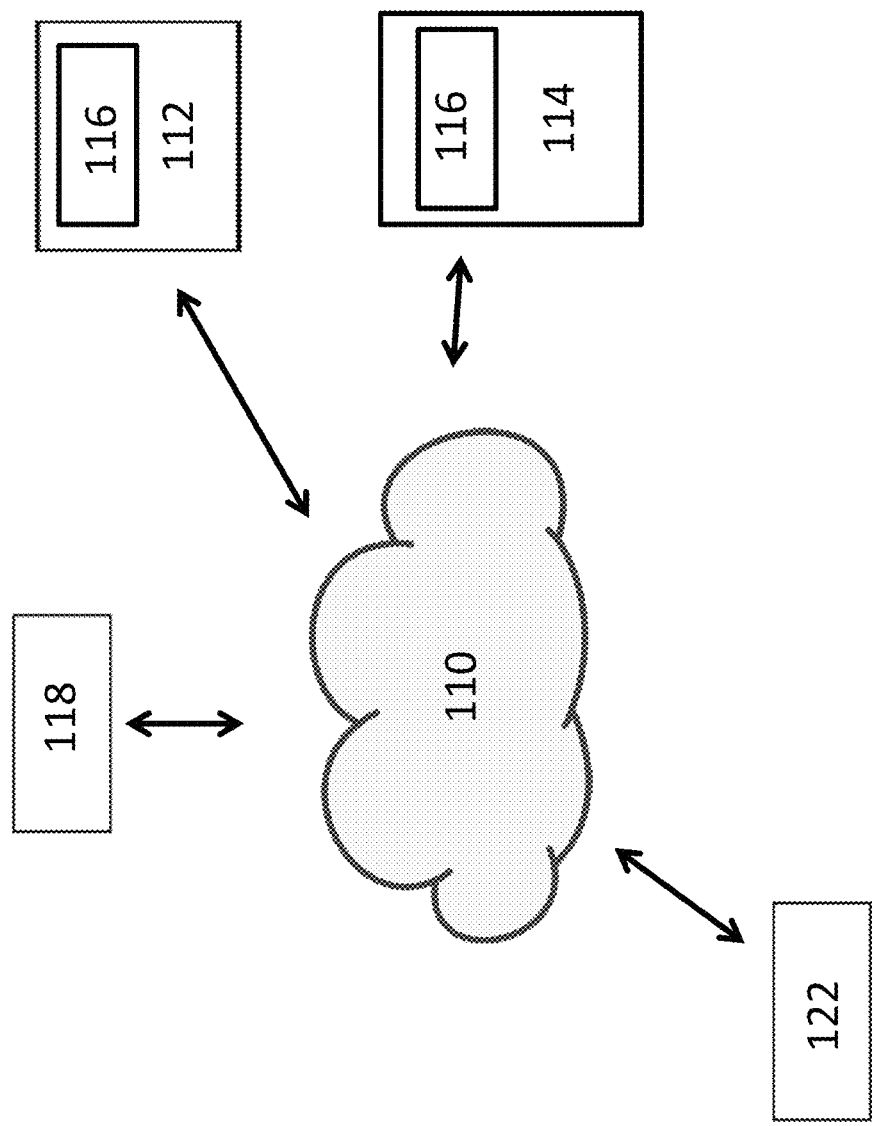
FIG. 2 is a diagram of a network environment.

FIG. 2 is a diagram of example environment 100 in which systems, devices, and/or methods described herein may be implemented. FIG. 1 shows network 110, user device 112, user device 114, electronic application 116, verification server 118, GPS satellite 120, and server 122.

Network 110 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another network. In embodiments, network 110 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

User device 112 and/or 114 may include any computation or communications device that is capable of communicating with a network (e.g., network 110). For example, user device 112 and/or user device 114 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 112 and/or 114 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112 and/or 114. User device 112 and/or 114 may have a touch screen and/or a keyboard that allows a user to electronically interact with an electronic application. In embodiments, a user may swipe, press, or touch user device 112 and/or 114 in such a manner that one or more electronic actions will be initiated by user device 112 and/or 114 via an electronic application.

User device 112 and/or 114 may include a variety of applications, such as, for example, biometric a verification application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.).

Electronic application 116 may be capable of interacting with user device 112, user device 114, authentication server 118, GPS satellite 120, and/or server 122 to automatically and electronically receive electronic information for one or more persons. In embodiments, electronic application 116 may obtain electronic information about a person's identity, such as name, address, age, profession, biometric information, identifier information (e.g., social security information, health insurance information), and/or any other type of information. In embodiments, electronic application 116 may verify a person's location based on biometric and location information. In embodiments, electronic application 116 may be electronically configured to show photos, video, text, icons, graphical images, buttons, emojis, and/or any other electronic information. While FIG. 2 shows electronic application 116 on user device 112 and user device 114, some or all of the electronic processes performed by electronic application 116 may be stored by verification server 118.

Verification server 118 may include one or more computational or communication devices that gather, process, store, and/or provide information relating to one or more electronic pages associated with electronic application 116 that is searchable and viewable over network 110. While FIG. 2 shows a verification server 118 there may be additional verification servers 118 associated with one or more electronic applications 116. In embodiments, verification server 118 may receive electronic information based on a person's geographic location information and biometric information and verify a person's identity and/or location.

In embodiments, geographic location information may include street number, street name, street type, village, town, city, county, state, and/or country information. In embodiments, biometric information may include fingerprint information, retina information, facial information, voice information, and/or any other type of biometric information.

Server 124 may include one or more computational or communication devices that gather, process, store, and/or provide information relating to generate one or more electronic communications and/or electronic transactions based on a determination by verification server 118 that one or more persons have been verified to have performed a service at a particular geographic location, and/or one or more persons have been verified to have received a service at the same or similar geographic location.

Figure 3:
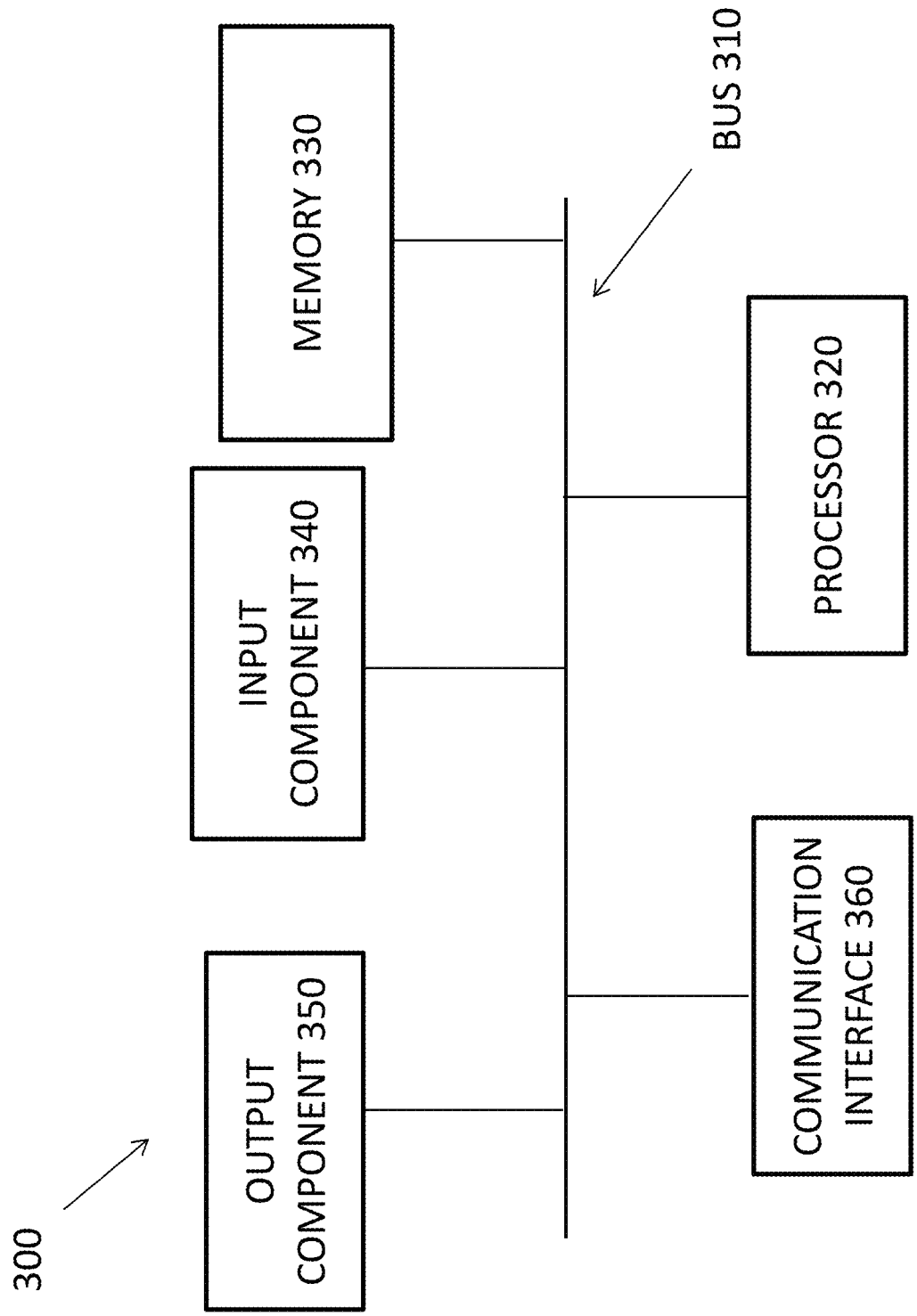
FIG. 3 is a diagram of an example computing device.

FIG. 3 is a diagram of example components of a device 300. Device 300 may correspond to user device 112, user device 114, verification server 118, GPS satellite 120, and server 122. Alternatively, or additionally, user device 112, user device 114, verification server 118, and server 122 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 110.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
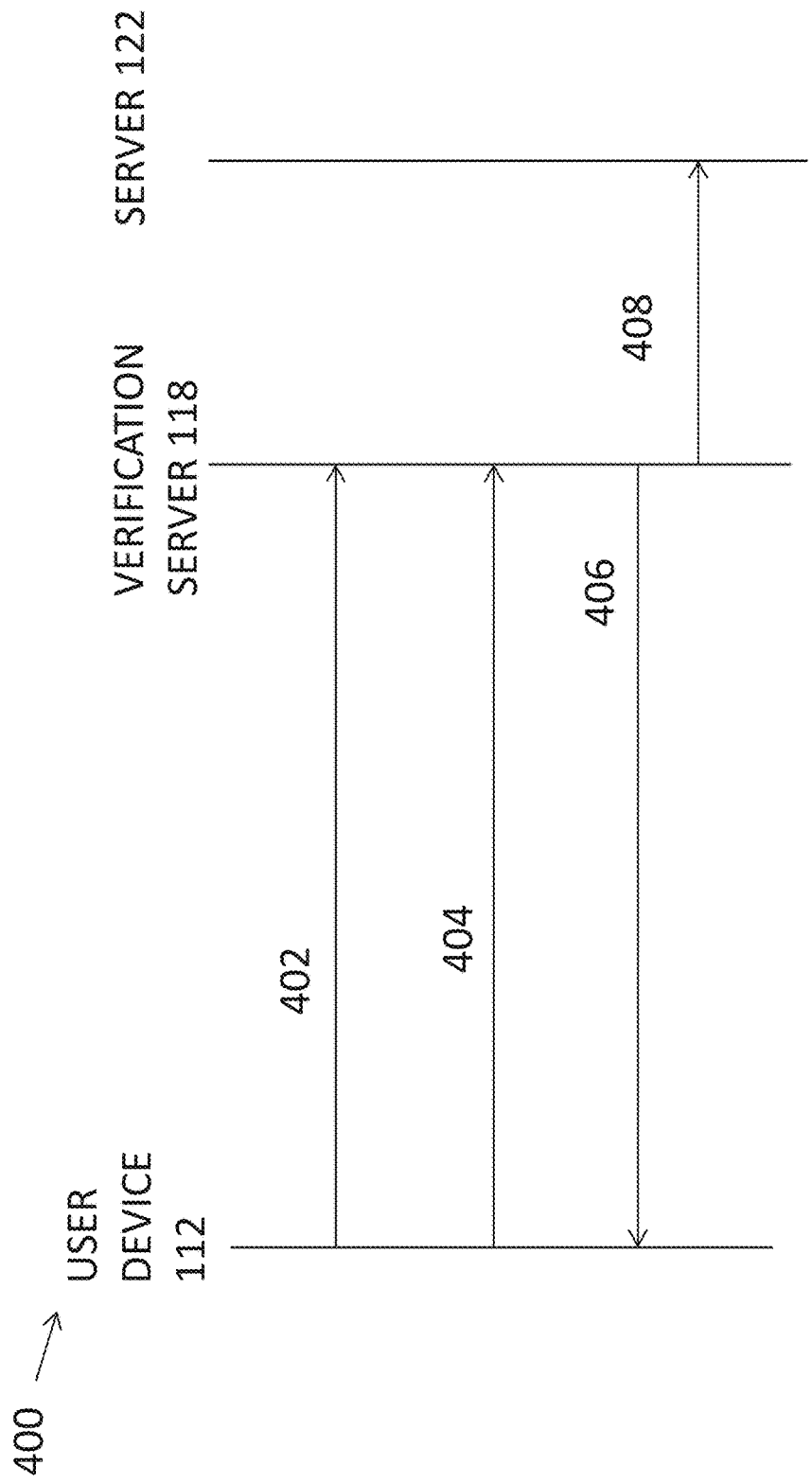
FIG. 4 is a flow diagram of example communications.

FIG. 4A describes an example communication flow process 400 for confirming a person's identity and location. As shown, FIG. 4A includes user device 112, verification server 118, and server 122. In embodiments, for FIGS. 4A, 4B, and 4C, a user has already been registered as a voter with electronic application 116 so that verification server 118 has stored biometric and other identification information about the voter. In embodiments, user device 112 has electronic application 116 downloaded or one or more electronic page associated with electronic application 116.

In embodiments, user device 112 may send a ping or other electronic communication, automatically, to verification server 118, with geographic location information which, in result, may cause verification server 118 to send an electronic communication message (e.g., a text message, email, phone call) at a particular period of time, to user device 112 that biometric information is required to be sent from user device 112.

Alternatively, verification server 118 may store information about future times and geographic locations associated with a user of user device 112, and verification server 112 may send, at a particular time, a reminder message (e.g., a text, email, phone call, etc.) to user device 112 to remind the user (e.g., the absent voter) of the appointment to use electronic application 116 to send biometric and/or location information.

In embodiments, no confirmation or reminder electronic communications may occur between user device 112 and verification server 118 before a user (e.g., an absent voter), of user device 112 arrives in a particular geographic location.

In embodiments, as shown in FIG. 4A, user device 112 may send an electronic communication 402 to verification server 118. In embodiments, electronic communication 402 may include geographic location information of the user (and user device 112).

In embodiments, user device 112 may send electronic communications 404 upon entry of the law enforcement professional's biometric information by the absent voter. In embodiments, the biometric information may be fingerprint information based on the user placing a finger (or thumb) onto the screen of user device 112, or based on the user placing the finger (or thumb) near user device 112 (e.g., within one centimeter of the screen of user device 112) with user device 112 capturing characteristics of the fingerprint.

Alternatively, the biometric information may be retina information that is obtained by user device 112 (and electronic application 116) by placing user device 112 within a particular distance (e.g., within one feet, two feet, etc.) of the user's retina. Thus, electronic application 116 may electronically capture characteristics of the retina. Alternatively, the biometric information may be facial information that is obtained by user device 112 (and electronic application 116) by placing user device 112 within a particular distance (e.g., within one foot, two feet, etc.) of the user's face so that the entire user face may be electronically analyzed by electronic application 116.

Alternatively, the biometric information may be voice information of the user that is obtained by user device 112 (and electronic application 116) by having the user to speak into a microphone device associated with user device 112. In embodiments, the biometric information may be a combination of different types of information, such as fingerprint, retina, facial, and/or voice information.

In embodiments, verification server 118 may receive electronic communication 404 and electronically analyze the biometric information with stored biometric information of the user that has been previously provided by the user to verification server 118. In embodiments, verification server 118 may determine that the biometric information matches the stored biometric information or the biometric information does not match the stored biometric information. In embodiments, if the biometric information matches, then verification server 118 may send an electronic confirmation communication to user device 112 and/or other computing devices that the biometric information matches. In embodiments, if the biometric information does not match, then verification server 118 may send an electronic non-confirmation communication to user device 112 and/or other computing devices that the biometric information does not match. Alternatively, verification server 118 may send the electronic confirmation or non-confirmation communications after receiving the geographic location information in electronic communication 404.

In embodiments, verification server 118 may compare the geographic location of user device 112 with store location information of the person of interest to confirm that a voter is not located in a particular location. In embodiments, verification server 118 may send an electronic communication (electronic communication 406) to user device 112 and another electronic communication (electronic communication 408) to server 122 based on the comparison of the received biometric and geographic information with stored biometric and geographic information. In embodiments, electronic communication 404 may include a time that electronic communication 404 was sent from the absent voter's user device.

In embodiments, verification server 118 may compare the sent time of electronic communication 404 with a distance between the user and the geographic location where voting is conducted. In embodiments, the sent time may be an electronic time stamp that includes time, day, month, and/or year information. Thus, if the electronic communications are sent from a distance that prevents the absent voter from arriving on election day to vote in person, verification server 118 may verify that the absent voter should be allowed to vote outside the voting area.

In embodiments, electronic communications 406 and 408 may include a confirmation message that the biometric information confirms the identity of the user and the geographic location information confirms that the user is at a particular location (e.g., another country, another state, etc.). Alternatively, electronic communications 406 and 408 may include a non-confirmation message that the biometric information does not confirm the identity of the user or the geographic location information indicates that the person may vote in person on election day. In embodiments, electronic communication 406 may provide confirmation to the absent voter that an absentee ballot may be posted. In embodiments, electronic communication 410 may be used by server 122 to confirm that verification has occurred.

Figure 5:
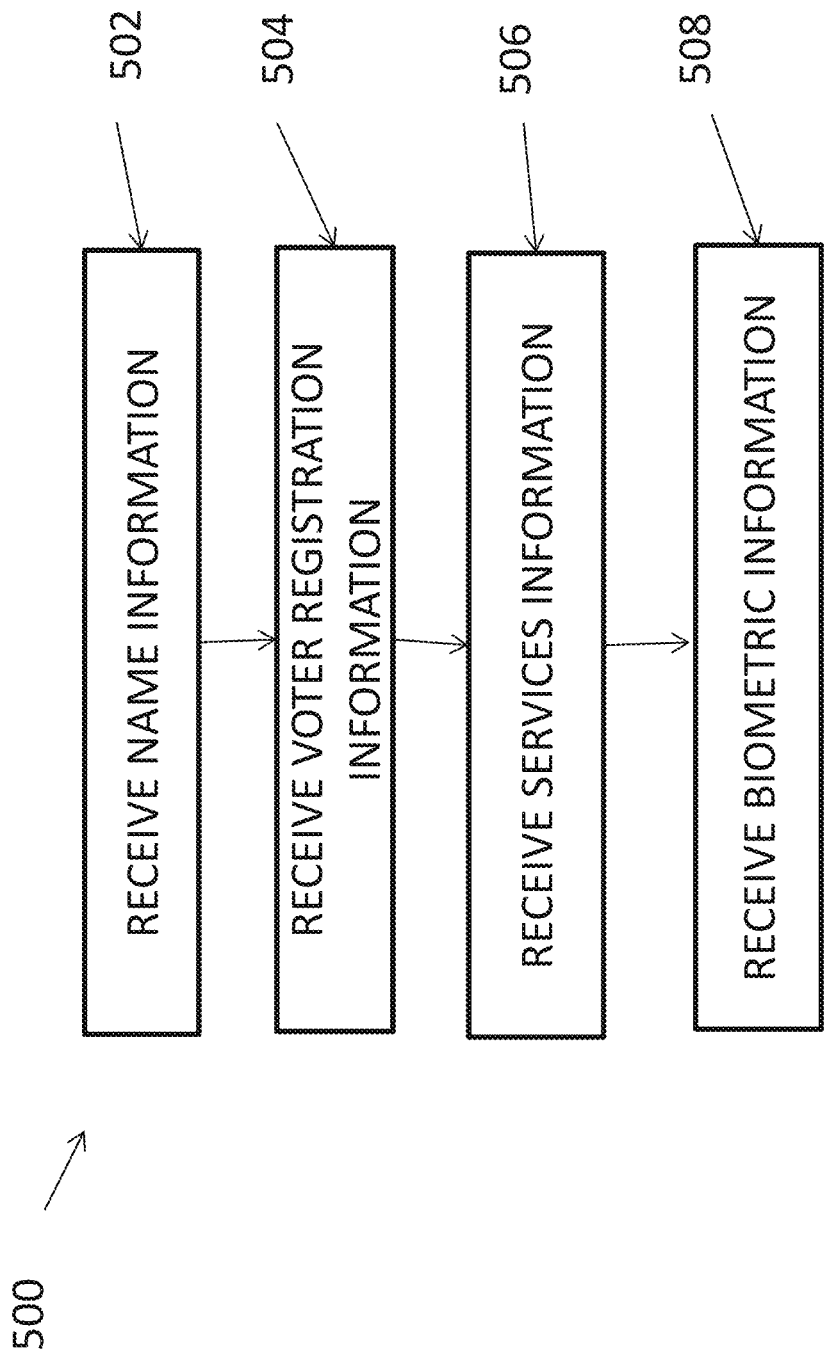
FIG. 5 is a flow chart of an example process for obtaining electronic registration information.

FIG. 5 is a flow chart of an example process 500 for obtaining information for registering a law enforcement professional with electronic application 116 and/or verification server 118. In embodiments, example process 500 may be performed by electronic application 116 and/or verification server 118 receiving electronic information from user device 112 and other computing devices, such as GPS satellite 120 and/or server 122. In embodiments, an electronic page associated with electronic application 116 is displayed on the screen of user device 112 and includes an electronic registration page and links (e.g., via icons, buttons, etc.) that, when electronically selected, allow a user to provide information to electronic application 116 or verification server 120 as described in FIG. 5.

At step 502, electronic application 116 and/or verification server 118 may receive name information. In embodiments, the name information may include an absent voter's first, middle, and/or last name. At step 504, electronic application 116 and/or verification server 118 may receive voter registration information. In embodiments, the voter registration may include a voter registration identification number, citizenship, a political affiliation to a political party, and/or other information. At step 506, electronic application 116 and/or verification server 118 may receive information about residency provided by the voter. This may include information such as the voter's home address, work address, state of residency, and/or other information. At step 508, electronic application 116 and/or verification server 118 may receive biometric information for the voter.

In embodiments, the biometric information may be fingerprint information based on the user placing a finger (or thumb) onto the screen of user device 112, or based on the user placing the finger (or thumb) near (e.g., within one centimeter of the screen of user device 112) and user device 112 capturing characteristics of the fingerprint.

Alternatively, the biometric information may be retina information that is obtained by user device 112 (and electronic application 116) by placing user device 112 within a particular distance (e.g., within one feet, two feet, etc.) of the user's retina. Thus, electronic application 116 may electronically capture characteristics of the retina. Alternatively, the biometric information may be facial information that is obtained by user device 112 (and electronic application 116) by placing user device 112 within a particular distance of the user's face so that the entire user face may be electronically analyzed by electronic application 116. Alternatively, the biometric information may be voice information of the user that is obtained by user device 112 (and electronic application 116) by having the user to speak into a microphone device associated with user device 112. In embodiments, the biometric information may be a combination of different types of information, such as fingerprint, retina, facial, and/or voice information. Upon receiving the information described in FIG. 5, electronic application 116 and/or verification server 118 may generate an electronic registration and profile for the voter.

FIG. 6 is a flow chart of an example process 600 for receiving verifying identity and location information. In embodiments, example process 600 may be performed by electronic application 116 and/or verification server 118.

At step 602, electronic application 116 and/or verification server 118 may receive location information associated with a voter while the voter alleges that they are not in a particular area and wishes to provide an absentee ballot. In embodiments, the location information may be sent automatically by a user device (e.g., user device 112) to electronic application 116 and/or verification server 118; or, the location information may be sent based on an electronic instruction by the voter to the user device. In embodiments, the location information may include address information. In embodiments, electronic application 116 and/or verification server 118 may receive, the location information.

At step 604, electronic application 116 and/or verification server 118 may receive biometric information associated with the voter. In embodiments, the biometric information may be fingerprint information, retina information, facial information, voice information, and/or any other biometric information. In embodiments, the location information may be sent by using any type of communications technology with a type of network as described in FIG. 2. In embodiments, electronic application 116 and/or verification server 118 may receive time information associated with the time that the biometric and location information is sent from the voter's user device.

At step 606, electronic application 116 and/or verification server 118 may confirm the voter's biometric, time, and/or location information. In embodiments, electronic application 116 and/or verification server 118 may compare the received biometric information (e.g., in step 604) and location information (e.g., in step 602) with stored biometric and location information (e.g., as described in FIG. 5).

In embodiments, electronic application 116 and/or verification server 118 may (1) confirm the voter's biometric information matches stored biometric information and location information does not match the voter's residence area, (2) confirm the voter's professional's biometric information matches the stored biometric information, but the voter's location information is within a particular distance of the voting area, (3), or no confirmation of the voter's biometric information and confirmation that the voter is located within a distance of the voting area.

In embodiments, electronic application 116 and/or verification server 118 may (a) confirm the person of interest's biometric matches the stored biometric information, or (b) not confirm the person of interest's biometric matches the stored biometric person of interest. Additionally, electronic application 116 and/or verification server 118 may confirm that the voter is a particular distance from the provided location and the location where voting occurs. Based on the distance, application 116 and/or verification server 118 may determine whether the voter can travel to the voting location and vote on election day.

At step 608, electronic application 116 and/or verification server 118 may send electronic communications based on confirming or not confirming that a voter can use an absentee ballot. In embodiments, the electronic communications may include information that biometric and/or the distance information has not been confirmed. In embodiments, the electronic communications may be sent to other user devices (e.g., user device 112 or 114) and other computing devices (e.g., server 122).

In embodiments, a confirmation message may only be sent when biometric information is matched for the voter and the voter's location is outside a particular distance from the voter's assigned voting station. In embodiments, other computing devices may use the confirmation (or non-confirmation) information to determine whether the voter can reach the voting station. For example, the additional electronic communications may be sent to servers associated with providing travel options. For example, an electronic communication may be sent to a bus company which provides interstate travel to determine whether the voter can take a bus to arrive at the voting station. In another example, an electronic communication may be sent to a state (e.g., Florida) department of transportation to determine whether travel times on particular roads can get the voter to the voting station on election day.

Figure 6B:
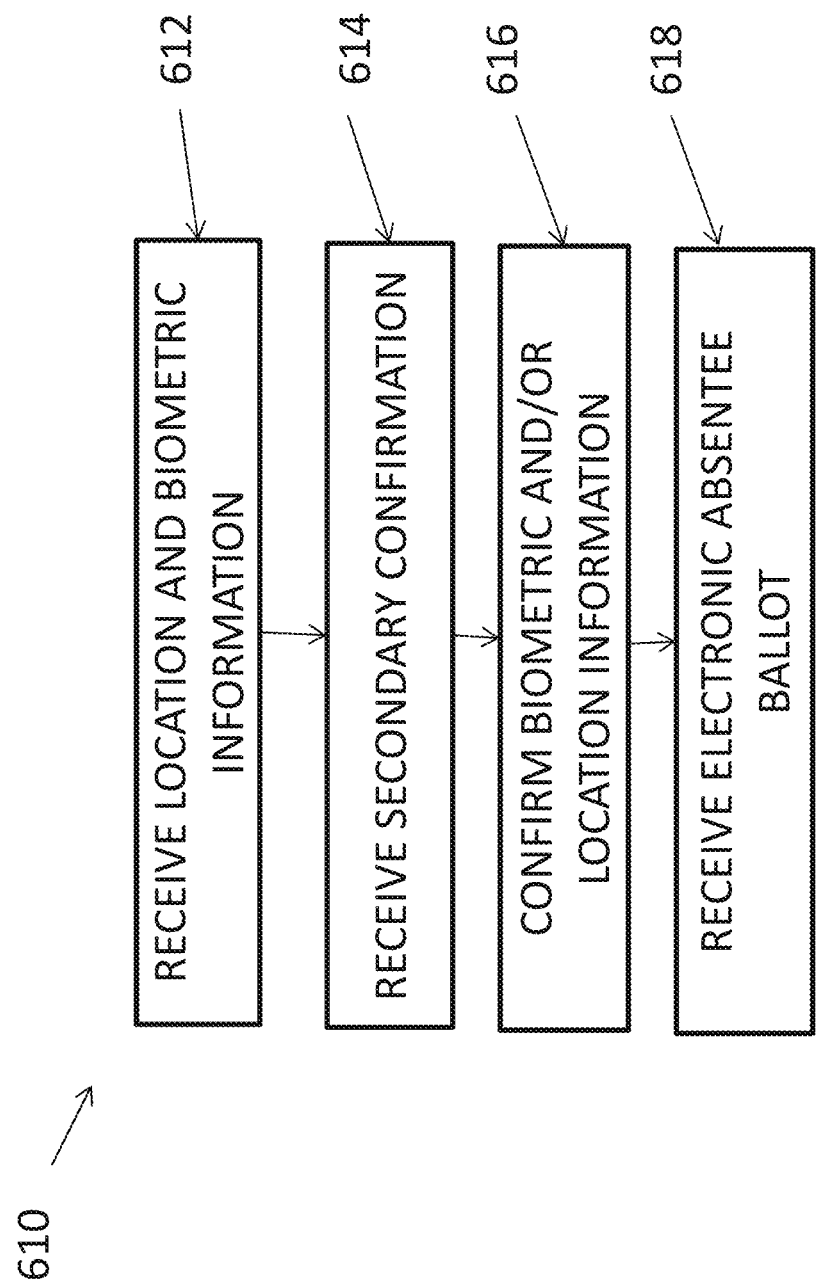

FIG. 6B is a flow chart of an example process 610 for receiving verifying identity and location information. In embodiments, example process 610 may be performed by electronic application 116 and/or verification server 118.

At step 612, electronic application 116 and/or verification server 118 may receive biometric and location information associated with a voter. In embodiments, the biometric and location information may be sent automatically by a user device (e.g., user device 112 and/or user device 114) to electronic application 116 and/or verification server 118. For example, the voter may send his/her location and biometric information upon entering his/her biometric information into a user device (e.g., user device 112). The voter may send his/her location and biometric information upon entering his/her biometric information into the same user device (e.g., user device 112) or another user device (e.g. user device 114). In embodiments, the location information may be sent by using GPS technology or any other type of communications technology with a type of network as described in FIG. 2. In embodiments, electronic application 116 and/or verification server 118 may receive a sent time of the electronic communication that includes the voter's location and biometric information; and, electronic application 116 and/or verification server 118 may receive a sent time (from the user device) of the electronic communication that includes the voter's location and biometric information.

At step 614, electronic application 116 and/or verification server 118 may secondary confirmation that the voter is at a particular location at a particular time. In embodiments, secondary confirmation may be provided by a certified entity. In embodiments, the certified entity may be previously certified by verification server 118. For example, the certified entity may be a governmental entity (e.g., state office, police station, embassy, etc.), a particular location that has gone through certification, and/or any other type of entity. In embodiments, the secondary confirmation may include sending an electronic communication that may include a message. In additional embodiments, the secondary confirmation may include location information of the certified entity which may be used to confirm that the voter is in the same location.

At step 616, electronic application 116 and/or verification server 118 may send electronic communications based on confirming a voter's biometric, time, and/or location information. In embodiments, the electronic communications may include information that biometric, time, and/or location information has or has not been confirmed. In embodiments, the electronic communications may be sent to other user devices (e.g., user device 112 or 114) and other computing devices (e.g., server 122). In embodiments, a confirmation message may only be sent when (1) the voter's biometric information is verified, (2) a distance and time between the voter's location and the voter's local voting station confirms that the voter will not be able to voter at the local voting station and should be allowed to electronically submit an electronic absentee ballot. At step 618, electronic application 116 and/or verification server 118 receive an electronic absentee ballot from voters who are verified to be outside the geographic location of their voting station.

FIG. 7 describes an example data structure 700 that stores one or more factors that are received about a voter's biometric and location information. In embodiments, data structure 700 may include a collection of fields such as ID 702, Biometric 704, Location 706, and Confirm 708. Although FIG. 7 shows example fields 702 to 708, in other embodiments, data structure 700 may include fewer fields, different fields, additional fields, and/or differently arranged fields than depicted in FIG. 7. In embodiments, each field may include sub-fields. In embodiments, verification server 118 may store some or all of data structure 700. Additionally, or alternatively, user device 112 or user device 114 may store some or all of data structure 700.

In embodiments, ID 702 may include identification information (name, pseudonym, etc.) of a law enforcement professional or a person of interest. In embodiments, information in ID 702 may include a person's name, an identifier, a voter registration number, etc. In embodiments, Biometric 704 may be biometric information received from a voter. In embodiments, Location 706 may be location information received from a voter. In embodiments, Confirm 708 may store confirmation or no confirmation based on (1) comparing information in Biometric 704 with stored biometric information received in a previous registration process, (2) comparing information in Location 706 (described in FIG. 9) is not within a particular geographic location associated with the voter's local polling/voting station, and/or (3) comparing time information with location information in Location 706 to determine that a voter cannot travel to the voter's local polling/voting station from the voter's location to vote in person.

Figure 8:
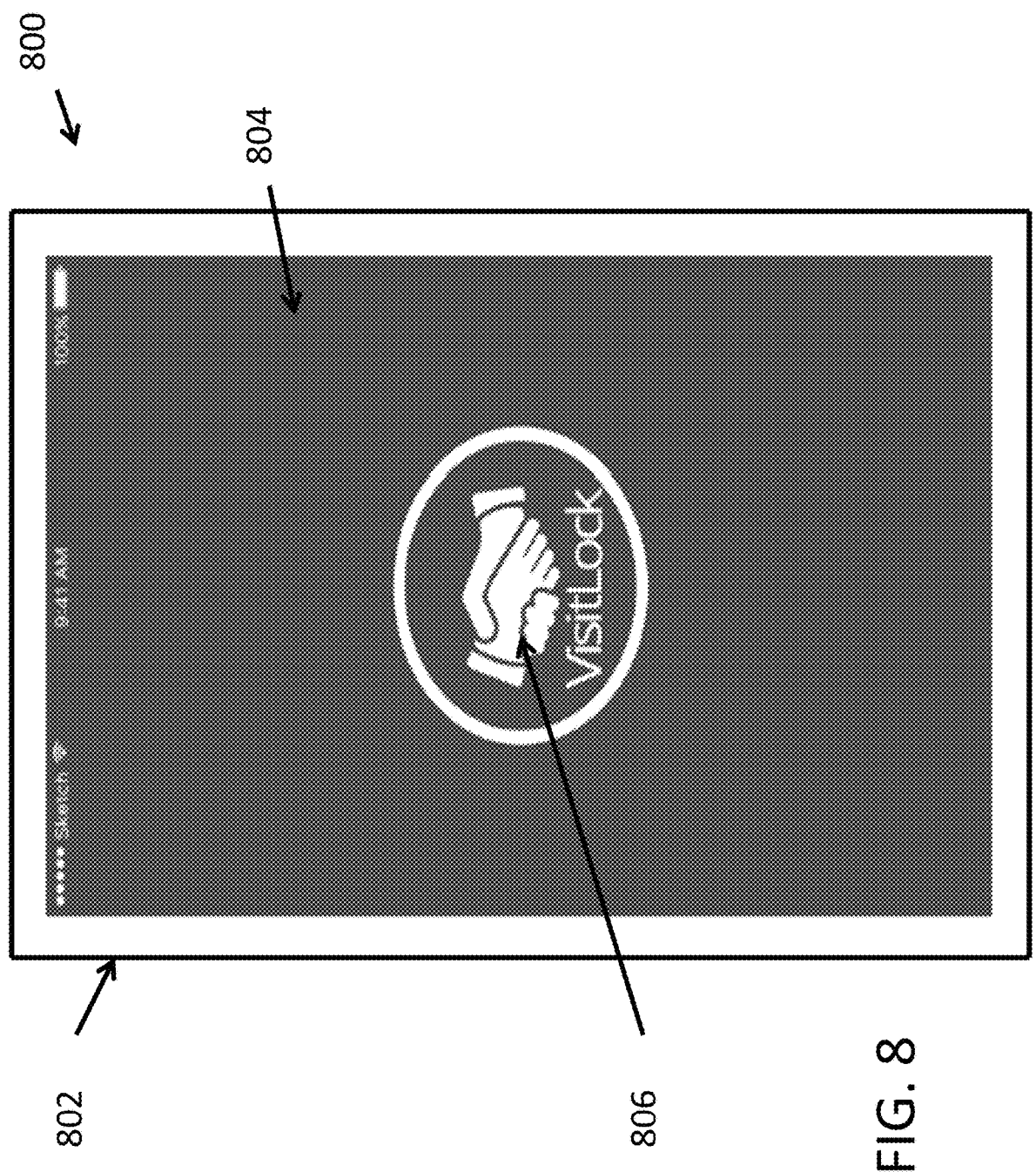
FIG. 8 is an example electronic screenshot.

FIG. 8 is an example display 800 of an electronic welcome page associated with electronic application 116. As shown, FIG. 8 includes user device 802, welcome page 804, and logo 806. In embodiments, user device 802 may be similar to user device 112 and/or user device 114. In embodiments, welcome page 804 may be an electronic page associated with electronic application 116 and may be electronically displayed by user device 802 when a website address is entered or an icon displayed on user device 802 is selected. In embodiments, logo 806 may be a logo that is displayed on welcome page 804 and indicates to someone that they have selected electronic application 116.

Figure 9:
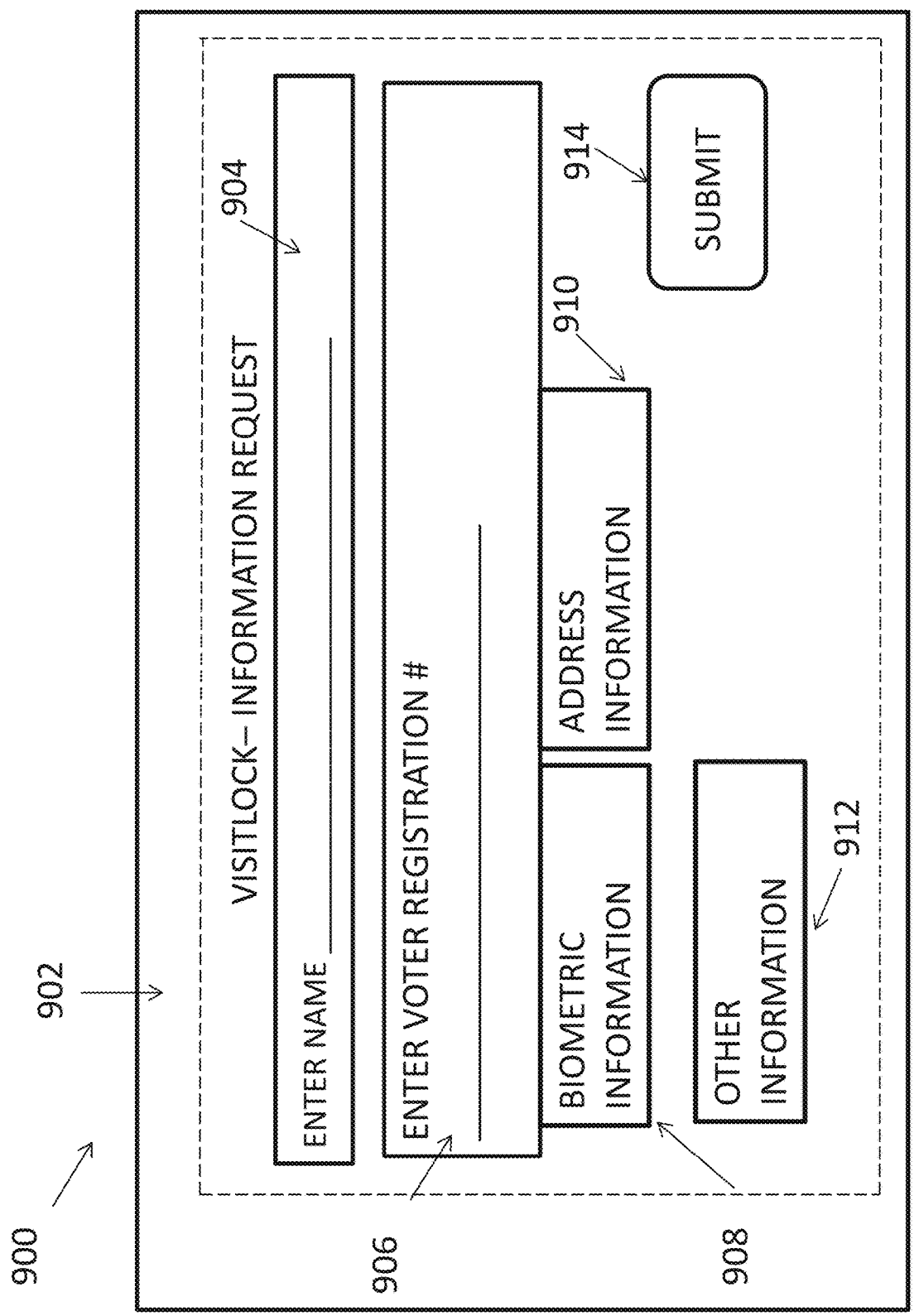
FIGS. 9 and 10 are example electronic registration forms.

FIG. 9 is an example electronic display 900 of an electronic registration page, for a voter, and is associated with electronic application 116. As shown, FIG. 9 includes registration page 902, name input 904, voter registration input 906, biometric information input 908, address information input 910, other information input 912, and submit 914. As shown in FIG. 9, registration page 902 is an electronic page associated with electronic application 116 and is selected based on a request (e.g., selection of an icon, button, etc.) by a user of a user device (e.g., user device 113). In embodiments, registration page 902 may be electronically displayed on a screen of the user device.

In embodiments, name input 904 allows a user (e.g., a voter) to enter name information. Additionally, name input 904 may provide additional information such as gender, age, and/or other information. In embodiments, voter registration information input 906 may allow the user to enter the voter's registration information. In embodiments, biometric information 908 may allow the user to enter biometric information. In embodiments, the biometric information may be fingerprint information, retina information, facial information, voice information, and/or any other type of biometric information.

In embodiments, address information 910 may include address information about the voter than indicates their residency that is used for voter registration. In embodiments, other information 912 may be other information that can be inputted and associated with a registration. In embodiments, other information 912 may include other types of information, such as social security information, and/or nationality information. In embodiments, submit 914 may be an electronic button that, when selected, creates a registration profile and/or sends electronic information for storage regarding a law enforcement professional.

Figure 10:
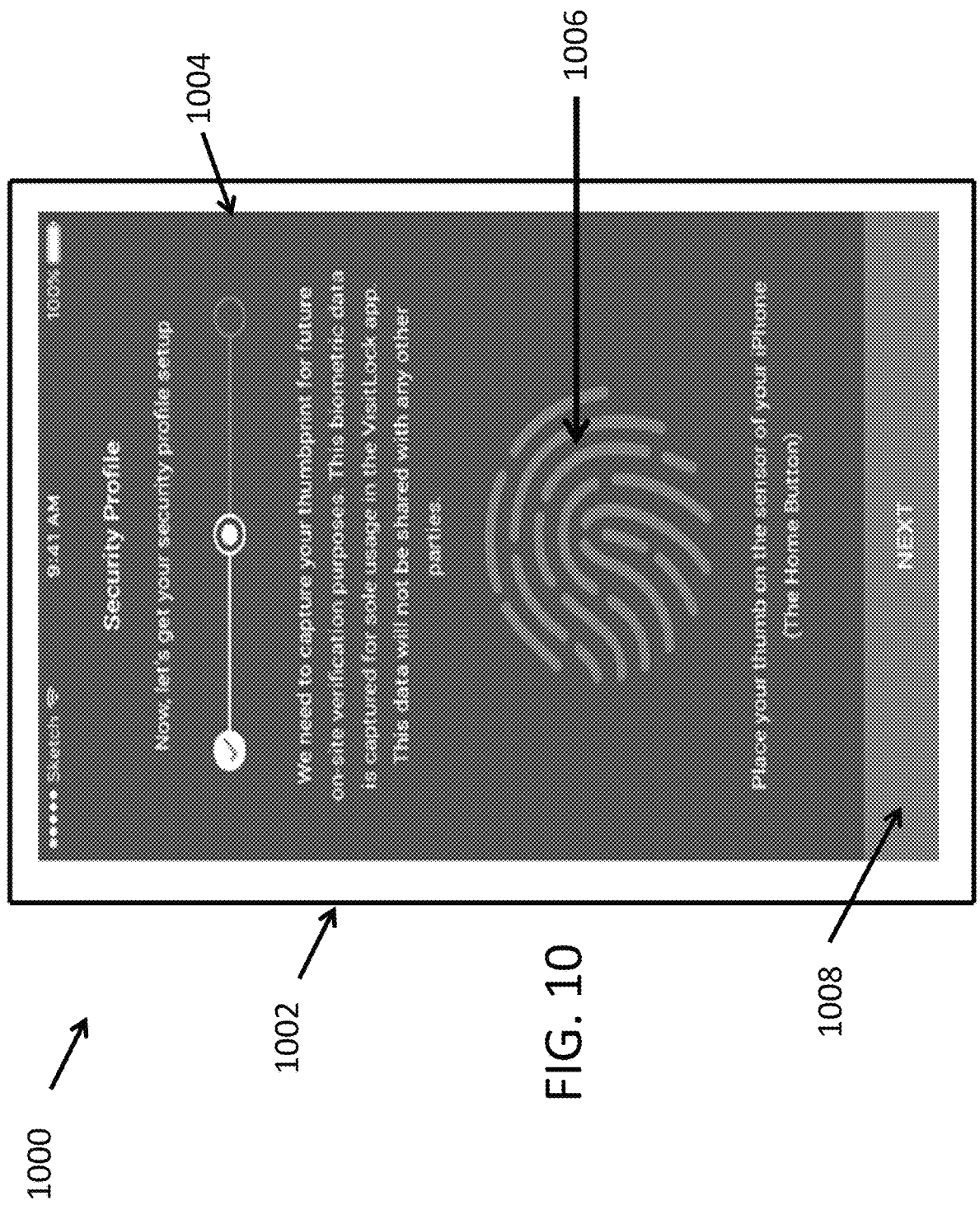

FIG. 10 is a display of an example registration page 1000. As shown, FIG. 10 shows a user device 1002, setup page 1004, fingerprint input area 1006, and next button 1008. In embodiments, setup page 1004 (associated with electronic application 116) may allow for a voter to provide fingerprint biometric information. In embodiments, fingerprint input area 1006 may receive fingerprint information based on a user pressing a finger or thumb onto the screen of user device 1002 or within close proximity (e.g., within one centime, two centimeters, etc.) to the screen of user device 1002. In embodiments, next button 1008 may be an electronic button that, when selected (e.g., touching, swiping, etc.) causes a different electronic page (associated with electronic application 116) to be displayed on user device 1002.

Figure 11:
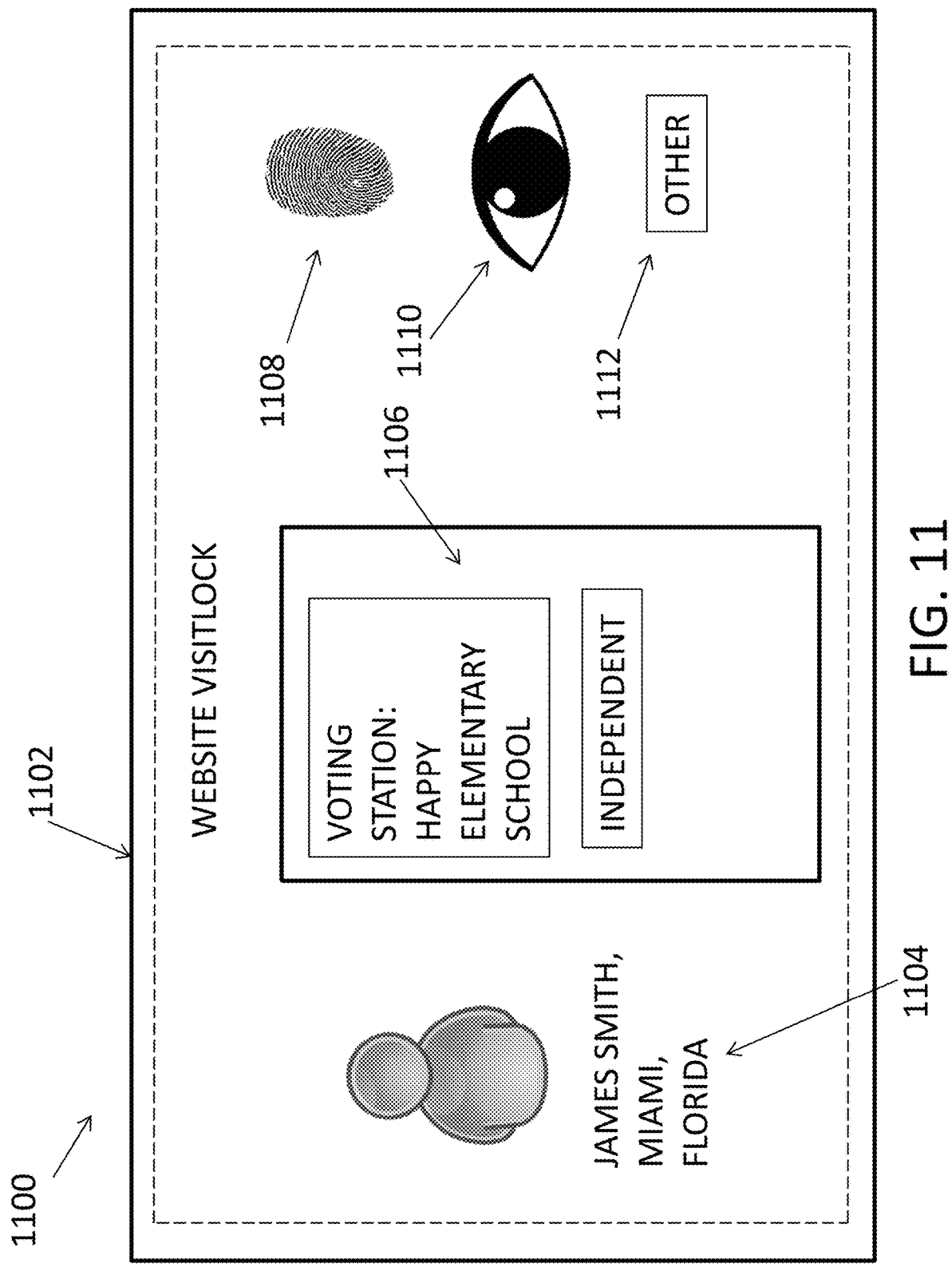
FIG. 11 is an example electronic input form.

FIG. 11 is an example screenshot 1100 that shows information about a registered law enforcement professional with electronic application 116 and/or verification server 118. FIG. 11 shows screen shot 1102, identity 1104, professional information 1106, fingerprint information 1108, retina information 1110, and other biometric information 1112. While FIG. 11 shows a particular display, example screenshot 1100 may have a different design with additional or fewer types of information.

In embodiments, screen shot 1102 may be of a registered voter who has registered with electronic application 116 and based on processes as described in other figures, such as FIG. 5. In embodiments, identity 1104 may describe a name and location of a voter registered with electronic application 116. In embodiments, professional information 1106 may include the voting station for the voter and the voter's political affiliation. In embodiments, fingerprint logo 1108 may indicate, when selected, fingerprint information provided by the law enforcement professional. In embodiments, retina logo 1110 may, when selected, include retina information provided by the law enforcement professional. In embodiments, other biometric logo 1112 may, when selected, include other types of biometric information such as facial information or voice information. In embodiments, fingerprint logo 1508, retina logo 1510, or other biometric logo 1112 may include no information; however, at least one of 1508, 1510, and 1512 require biometric information.

Figure 12:
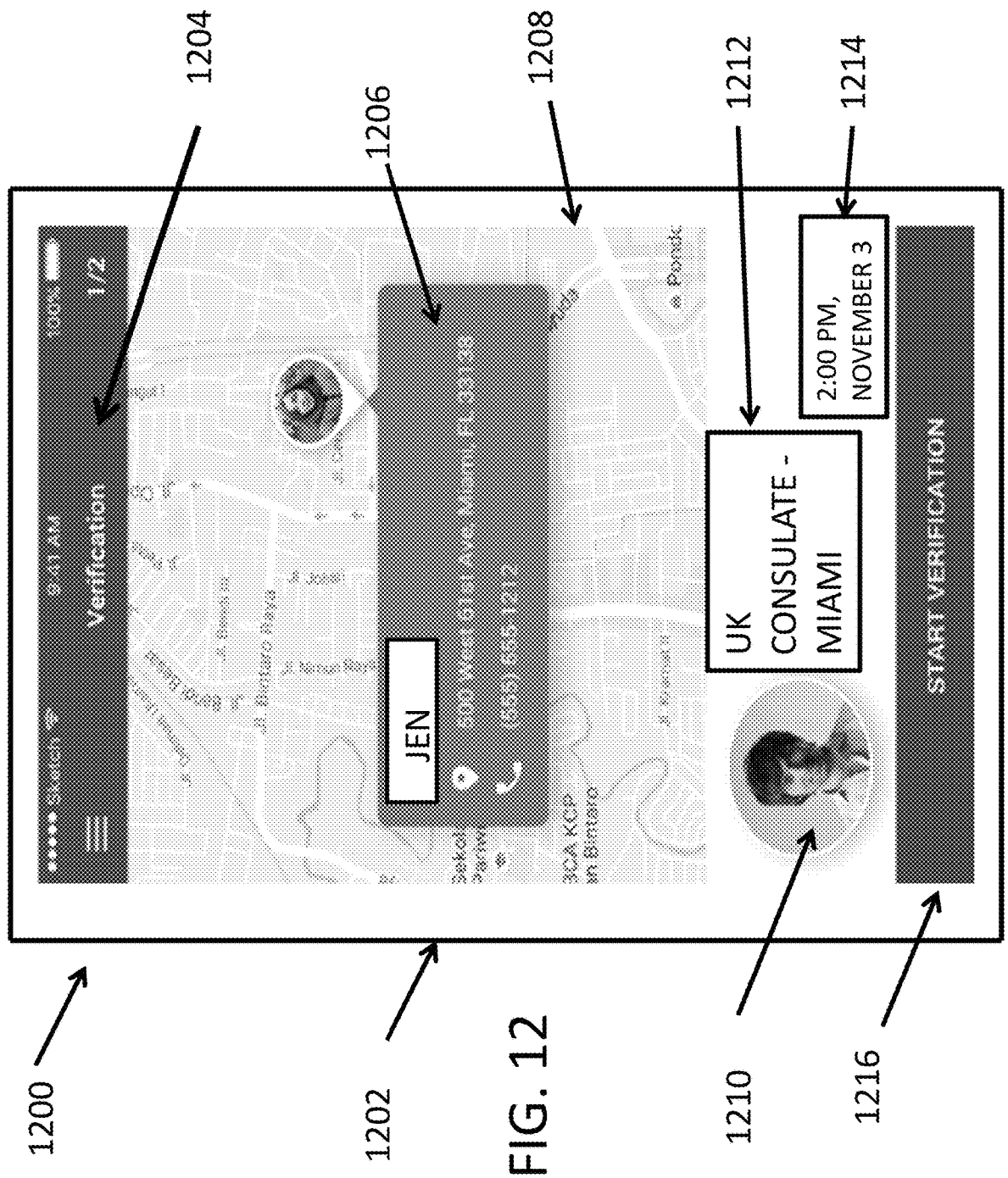
FIGS. 12 and 13 are example electronic verification forms.

FIG. 12 is an example screen shot 1200 of a verification page 1202 that is electronically displayed by a user device, such as user device 112, and is associated with electronic application 116. As shown, FIG. 12 shows verification header 1204, address information 1206, map 1208, image 1210, identifier 1212, time 1214, and verification button 1216. While FIG. 12 shows a particular display, example screenshot 1200 may have a different design with additional or fewer types of information.

In embodiments, verification header 1204 may include electronic information that informs a user that verification page 1202 is being displayed. In embodiments, address information 1206 may describe the address of a person of interest ("Jane Doe" at "500 West 61$^{st}$ Avenue, Miami 33138"), image, and phone number of the person of interest.

In embodiments, address information 1206 may be automatically displayed when user device 112 is within a particular area near or a verification center (e.g. consulate, embassy, police station) information in verification server 118 that is sent to user device 112 when verification server 118 determines the user device 112 is within a particular distance of the verification center. For example, Jen may be in Miami and is within 10 miles of the U.K Consulate when she receives a notification. Jen is a citizen of the United Kingdom and is in Miami on election day in the U.K. which for the purposes of the example is November 3. Jen may be sent an electronic communication to proceed to the U.K. Consulate for confirmation that she is not in the U.K. to vote in person. In this example, Jen may arrive at the U.K. Consulate and be verified at 2:00 PM. Accordingly, Jen may then receive another electronic message that permits her to send an electronic absentee ballot.

Figure 13:
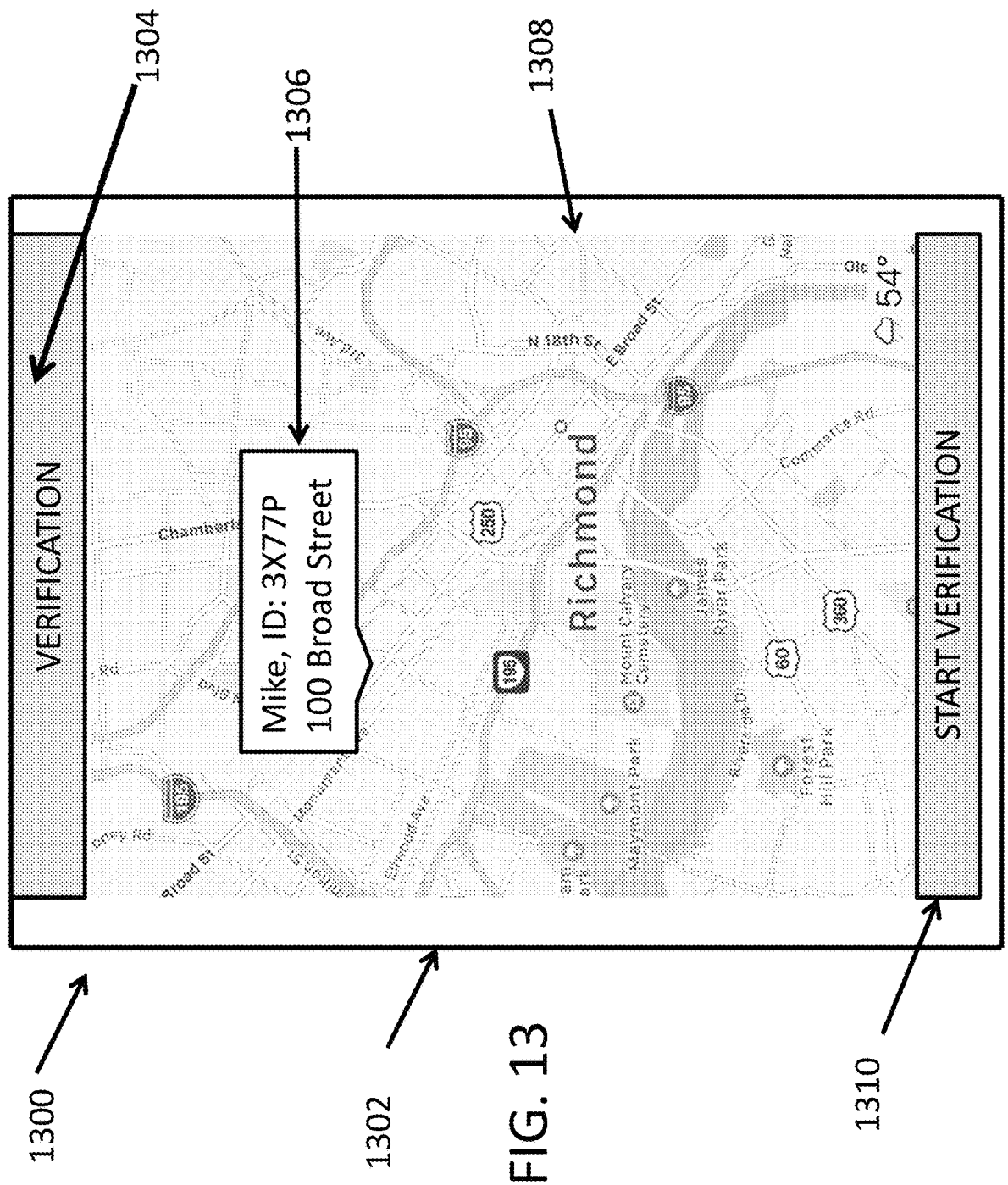

FIG. 13 is an example screen shot 1300 of a verification page 1302 that is electronically displayed by a user device, such as user device 112, and is associated with electronic application 116. As shown, FIG. 13 shows verification header 1304, identity and address information 1306, map 1308, and verification button 1310. While FIG. 13 shows a particular display, example screenshot 1300 may have a different design with additional or fewer types of information. In embodiments, verification header 1304 may include electronic information that informs a user that verification page 1302 is being displayed. In embodiments, identity and address information 1306 may describe the address of a person of interest ("Mike" at "100 Broad Street"), and ID associated with the person of interest.

In embodiments, map 1308 may be a map that is electronically displayed within electronic application 116. In embodiments, verification button 1310 may, when selected, begins a verification process which may require the person of interest professional to provide additional information such as biometric information. In embodiments, the biometric information at the end of the visit may also provide confirmation of the person of interest's location.

Figure 14:
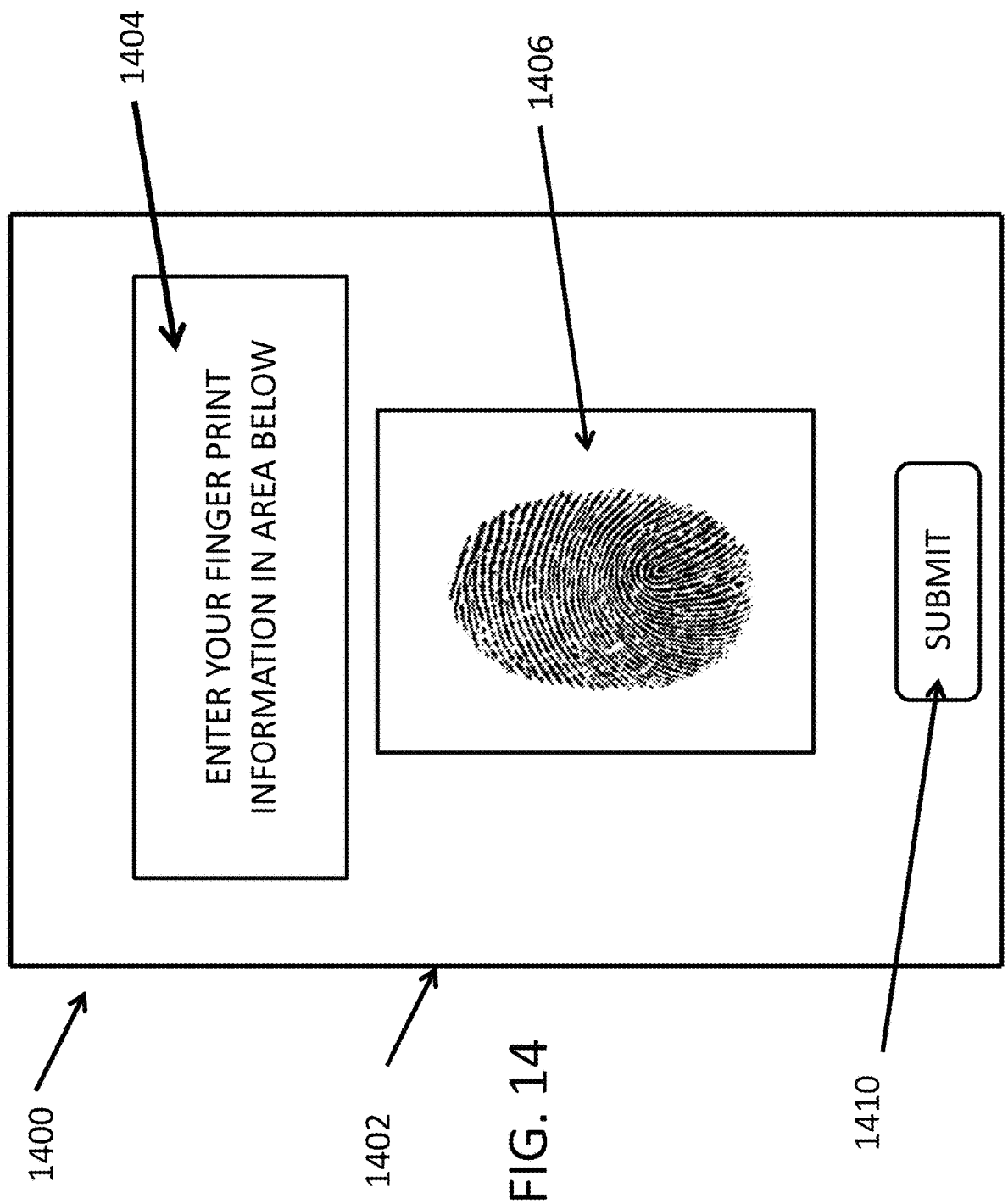
FIG. 14 is an example electronic biometric submission form.

FIG. 14 is an example screen shot 1400 of an electronic biometric submission page 1402 which is electronically displayed on a user device based on a user selecting a "start verification" electronic button, such as described in FIGS. 12 and 13. As shown in FIG. 14, a user (either a law enforcement professional or a person of interest) may enter a fingerprint in a particular area on a user device screen. FIG. 14 shows message area 1404, biometric entry area 1406, and submit button 1408. In embodiments, the biometric information entered onto the touchscreen in biometric entry area 1406 based on information provided in message area 1404. In embodiments, once the biometric information has been entered, the user may electronically select submit button 1408 which results in the biometric information being electronically analyzed and communicated to a server. In embodiments, the server may determine whether the biometric information matches the user's stored biometric information and generate a confirmation or non-confirmation message.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. It will be understood that time information includes time, day, month, and/or year information and may be an electronic time stamp. Also it will be understood that any of the various actions can result in any type of electronic information to be displayed in real-time and/or simultaneously on multiple user devices (e.g., similar to user device 124). For FIGS. 5, 6, 7, and 8, the order of the blocks may be modified in other implementations. Further, non-dependent blocks may be performed in parallel.

In the preceding specification, it should be understood that when two locations are matched to confirm two individuals are at the same location, this may refer to two individuals (via their user devices) that are within a particular distance of each other. For example, the location information may be based on determining an address (e.g., 100 Main Street) that is then used to confirm that two individuals are at the same location. Also, for example, the location information may be compared and considered to be at the same location based on the two individuals (via their user devices) being within a particular distance of each other (e.g., 10 feet of each other, 15 feet of each other, etc.) such that the particular distance is based on the ability of one person to provide confirmation services, in person, to another person.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
receiving, by a device, electronic biometric information;
receiving, by the device, first electronic location information, wherein the first electronic location information is associated with the electronic biometric information;
analyzing, by the device, the electronic biometric information;
analyzing, by the device, the first electronic location information;
verifying, by the device, that the first electronic biometric information matches stored biometric information;
confirming, by the device, that the first electronic location information is not within a particular distance from of a stored second geographic location, wherein the stored second geographic location is a voting location associated with a voter having the electronic biometric information;
permitting, by the device, based on the verifying of the electronic biometric information and the confirming that the voter is not within the stored second geographic location, to receive electronic voting information associated with the electronic biometric information;
receiving, by the device, electronic voting information, wherein the electronic voting information includes the voter's name, political affiliation, date of birth, home address, voting station address, and voter registration number;
sending, by the device, based on the first electronic location information, electronic communication to another device, associated with the voter to instruct the voter to go to a third geographic location, wherein the third geographic location is located in a country and in which the stored second geographic location is not located in the country;
receiving, by the device, another electronic communication that the voter has arrived at the third geographic location;
sending, by the device, an additional electronic communication that an electronic vote is permitted by the voter since the voter is located at the third geographic location;
receiving electronic vote information associated with the electronic vote;
receiving the electronic biometric information at a second time;
receiving a fourth location associated with the electronic biometric information at the second time;
determining that the fourth location is within a particular distance from the stored second geographic location;
denying any electronic communication associated with another vote based on determining that the voter, associated with the electronic biometric information, is not absent from the stored second geographic location since the voter is present in the stored geographic location.

2. The electronic communications method of claim 1, wherein the voter associated with the electronic biometric information cannot reach the stored geographic location within a particular amount of time given for voting in a particular election.

3. The electronic communications method of claim 1, wherein the electronic biometric information is associated with at least one of fingerprint, eye, or facial information.

4. A device, comprising:
a memory, and
a processor, coupled to the memory, to:
receive electronic biometric information;
receive first electronic location information, wherein the first electronic location information is associated with the electronic biometric information;
analyze the electronic biometric information;
confirm that the first electronic location information is not within a particular distance from a stored second geographic location, wherein the stored second geographic location is a voting location associated with a voter having the electronic biometric information;
receive electronic voting information from a device, being used by the voter, that is at the first electronic location information; and
permit, based on the confirming that the voter is not located within the stored second geographic location, receipt of the electronic voting information associated with the electronic biometric information,
wherein the electronic voting information includes the voter's name, political affiliation, date of birth, home address, voting station address, and voter registration number;
send, based on the first electronic location information, electronic communication to another device, associated with the voter to instruct the voter to go to a third geographic location, wherein the third geographic location is located in a country and in which the stored second geographic location is not located in the country;
receive another electronic communication that the voter has arrived at the third geographic location;
send an additional electronic communication that an electronic vote is permitted by the voter since the voter is located at the third geographic location;
receive electronic vote information associated with the electronic vote;
receive the electronic biometric information at a second time;
receive a fourth location associated with the electronic biometric information at the second time;
determine that the fourth location is within a particular distance from the stored second geographic location;
deny any electronic communication associated with another vote based on determining that the voter, associated with the electronic biometric information, is not absent from the stored second geographic location since the voter is present in the stored geographic location.

5. The device of claim 4, wherein the voter associated the electronic biometric information cannot reach the stored geographic location within a particular amount of time and vote in person.

6. The device of claim 5, wherein the electronic voting information is associated with the stored second geographic location.

7. The device of claim 6, wherein the stored second geographic location is determined based on the electronic biometric information, wherein the stored second geographic location includes the voter's home address and voter information.

8. The device of claim 4, wherein the electronic biometric information is associated with electronic voting information.

9. The device of claim 4, wherein the stored second geographic location cannot be travelled to from the first geographic location within a particular amount of time.

* * * * *